United States Patent
Inamdar et al.

(10) Patent No.: US 11,386,366 B2
(45) Date of Patent: Jul. 12, 2022

(54) METHOD AND SYSTEM FOR COLD START CANDIDATE RECOMMENDATION

(71) Applicant: Oracle International Corporation, Redwood Shores, CA (US)

(72) Inventors: Sonali Vijay Inamdar, Redwood City, CA (US); Simon Chow, San Francisco, CA (US); Carlos E. Hernández Rincón, Zapopan (MX)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 36 days.

(21) Appl. No.: 16/940,743

(22) Filed: Jul. 28, 2020

(65) Prior Publication Data
US 2021/0097471 A1    Apr. 1, 2021

Related U.S. Application Data

(60) Provisional application No. 62/907,324, filed on Sep. 27, 2019.

(51) Int. Cl.
    G06Q 10/06    (2012.01)
    G06F 16/2457    (2019.01)
    G06N 20/00    (2019.01)

(52) U.S. Cl.
    CPC ........ *G06Q 10/063112* (2013.01); *G06F 16/24578* (2019.01); *G06N 20/00* (2019.01)

(58) Field of Classification Search
    CPC combination set(s) only.
    See application file for complete search history.

(56) References Cited

U.S. PATENT DOCUMENTS 9,665,641 B1    5/2017    Zhang
2015/0317605 A1*  11/2015  Rao .............. G06Q 10/1053
                                          705/321

(Continued)

FOREIGN PATENT DOCUMENTS

CN    105787639 A    7/2016
WO    2019/068253 A1    4/2019

OTHER PUBLICATIONS

Dang et al.: "Two-Stage Learning to Rank for Information Retrieval" found on the internet Sep. 24, 2020 at: http://webcache.googleusercontent.com/search?q=cache:mR_Y_vifiF8J:citeseerx.ist.psu.edu/viewdoc/download%3Fdoi%3D10.1.1.366.7926%26rep%3Drep1%26type%3Dpdf+&cd=1&hl=en&ct=clnk&gl=in&client=firefox-b-d.

(Continued)

*Primary Examiner* — Arif Ullah
(74) *Attorney, Agent, or Firm* — Tarolli, Sundheim, Covell & Tummino LLP

(57) ABSTRACT

A system and method are presented for cold start candidate recommendation. In some examples, a search query request that includes a candidate search parameter can be received for a candidate list. During a first search query, a subset of candidates from a plurality of candidates can be identified based on a comparison of each candidate vector for each candidate and a candidate search parameter vector for the candidate search parameter, and ranked to provide an initial ranked candidate list based on assigned scores for the subset of candidates. During a second search query, the search parameter a candidate index can be evaluated to identify a set of candidates from the plurality of candidates, re-ranked to provide an updated ranked candidate list corresponding to the candidate list based on updated assigned scores for the set candidates and a re-ranking parameter.

18 Claims, 6 Drawing Sheets

(56) References Cited

U.S. PATENT DOCUMENTS

| | | | |
|---|---|---|---|
| 2015/0317610 A1 | 11/2015 | Rao et al. | |
| 2017/0061382 A1* | 3/2017 | Zhang | G06Q 10/1053 |
| 2017/0344556 A1 | 11/2017 | Wu et al. | |
| 2018/0336528 A1* | 11/2018 | Carpenter | G06F 16/3334 |
| 2019/0102704 A1* | 4/2019 | Liu | G06N 5/022 |
| 2019/0179903 A1* | 6/2019 | Terry | G06N 3/004 |
| 2021/0334309 A1* | 10/2021 | Tsutsumi | G06F 16/90332 |

OTHER PUBLICATIONS

Fang: "Learning To Rank Candidates for Job Offers Using Field Relevance Models"; found on the internet Sep. 24, 2020 at: https://webcache.googleusercontent.com/search?q=cache:Fi3N_GmFti0J:https://lct-master.org/getfile.php%3Fid%3D1342%26n%3D1%26dt%3DTH%26ft%3Dpdf%26type%3DTH+&cd=4&hl=en&ct=clnk&gl=in.

Faliagka, et al.: "Application of Machine Learning Algorithms to an online Recruitment System" found on the internet Sep. 24, 2020 at: http://citeseerx.ist.psu.edu/viewdoc/download?doi=10.1.1.885.909&rep=rep1&type=pdf.

Schmitt, et al.: "Matching Jobs and Resumes: a Deep Collaborative Filtering Task"; EPiC Series in Computing vol. 41, 2016, pp. 124-137 GCAI 2016. 2nd Global Conference on Artificial Intelligence; found on the internet Sep. 24, 2020 at: https://easychair.org/publications/open/Jwh.

Zehlike, et al.: "Reducing Disparate Exposure in Ranking: A Learning To Rank Approach"; May 27, 2020; found on the Internet Sep. 24, 2020 at: https://arxiv.org/pdf/1805.08716.pdf.

* cited by examiner

```
"candidates": [
      "300100158576355, // Has almost no experience - AI-CAN-QAM20
      "300100158576217, // Worked in chemical plant and day care - AI-CAN-
QAM18
      "300100158576523, // Worked in the food industry - AI-CAN-QAM10
      "300100158576312, // Worked in the manufacturing industry - AI-CAN-QAM8
      "300100158581548, // Worked in the food industry - AI-CAN-QAM7
      "300100158581700, // A good fit - AI-CAN-QAM1
      "300100158576240,
      "300100158581759",
      "300100158576403",
      "300100158576190",
      "300100158581852",
      "300100158581634",
      "300100158576436",
      "300100158581792",
      "300100158576273",
      "300100158576465"
   ]
 }
```

FIG. 3

```
"candidates": [
      "300100158576403", // Possesses background as a Quality Assurance
Manager in the chemical industry
      "300100158576436", // Possesses background as a Quality Assurance
Manager in the chemical industry
      "300100158576273", // Background on pharma
      "300100158581634", // Background on chemical industry
      "300100158581792",
      "300100158581700",
      "300100158581819",
      "300100158581548",
      "300100158581852",
      "300100158576312",
      "300100158576465",
      "300100158576217",
      "300100158581759",
      "300100158576240",
      "300100158576190", // Almost no experience, and nothing related to
chemical/bio/pharma
      "300100158576355" // The original top recommendation with almost no
data in his profileExperiences
   ]
```

FIG. 4

METHOD AND SYSTEM FOR COLD START CANDIDATE RECOMMENDATION

RELATED APPLICATIONS

This application claims priority to each of U.S. Provisional Patent Application Ser. No. 62/907,977, filed 30 Sep. 2019, and U.S. Provisional Patent Application Ser. No. 62/907,324, filed 27 Sep. 2019. Each of these applications are hereby incorporated by reference.

TECHNICAL FIELD

This disclosure relates to a candidate recommendation system and use thereof. More specifically, this disclosure relates to a method and a system for cold start candidate recommendation.

BACKGROUND

A great deal of resources are invested in identifying appropriate candidates for a particular job. Organizations and recruiters generally receive large volumes of resumes for a job opening. The sheer number of resumes received by such organizations can create challenges in vetting the resumes, such that the best candidates can be selected for the particular job. To ease these challenges, information filtering system have been tailored for resume filtering to help organizations and recruiters in identifying qualified candidates.

SUMMARY

In an example, a computer implemented method for candidate recommendation can include receiving a search query request for a candidate list comprising at least one candidate search parameter. The computer implemented method can further include executing a first search query by generating a search parameter vector to represent the at least one candidate search parameter, applying each candidate of a plurality of candidates stored in memory as candidate data to a baseline machine learning (ML) model to provide a candidate vector for each candidate, identifying a subset of candidates of the plurality of candidates based on a comparison of each candidate vector to the search parameter vector, and ranking the subset of candidates based on assigned scores for the subset of candidates to provide an initial ranked candidate list. The computer implemented method can further include executing a second search query by evaluating a candidate index to identify a set of candidates from the plurality of candidates based on the at least one candidate search parameter, and re-ranking the set of candidates based on updated assigned scores for the set of candidates and a candidate re-ranking parameter to provide an updated ranked candidate list corresponding to the candidate list.

In another example, a system for candidate recommendation can include memory to store machine readable instructions and data, the data comprising resume data, a resume index, a pre-trained resume ML model and a candidate re-ranking parameter. The system can further included one or more processors to access the memory and execute the machine readable instructions. The machine readable instructions can include a search request interface programmed to receive a query request for a resume list comprising a job search parameter that can include job information data and job title information for a job, and a coarse search query parser. The coarse search query parser can be programmed to generate a job search parameter vector to represent the job search parameter, and a resume vector for each resume of the resume data by applying each resume to the pre-trained resume ML model. The coarse search query parser can further be programmed to compare the job search parameter vector to each resume vector to identify a subset of resumes from a plurality of resumes from the resume data, and rank the subset of resumes based on assigned scores for the subset of resumes to provide an initial ranked resume list. The machine readable instructions can further include a re-ranking parser selector programmed to selecting a given re-ranking parser from a set of re-ranking parsers based on parser selection data. The machine readable instructions can further the given re-ranking parser. The given re-ranking parser can be programmed to evaluate the resume index to identify a set of resumes from the plurality of resumes based on the job search parameter, and re-rank the set of resumes according to a ranking function and based on the candidate re-ranking parameter to provide an updated ranked resumes list corresponding to resume list.

BRIEF DESCRIPTION OF THE DRAWINGS

FIGS. 3-4 illustrate examples of ranked candidate lists.

DETAILED DESCRIPTION

Figure 1:
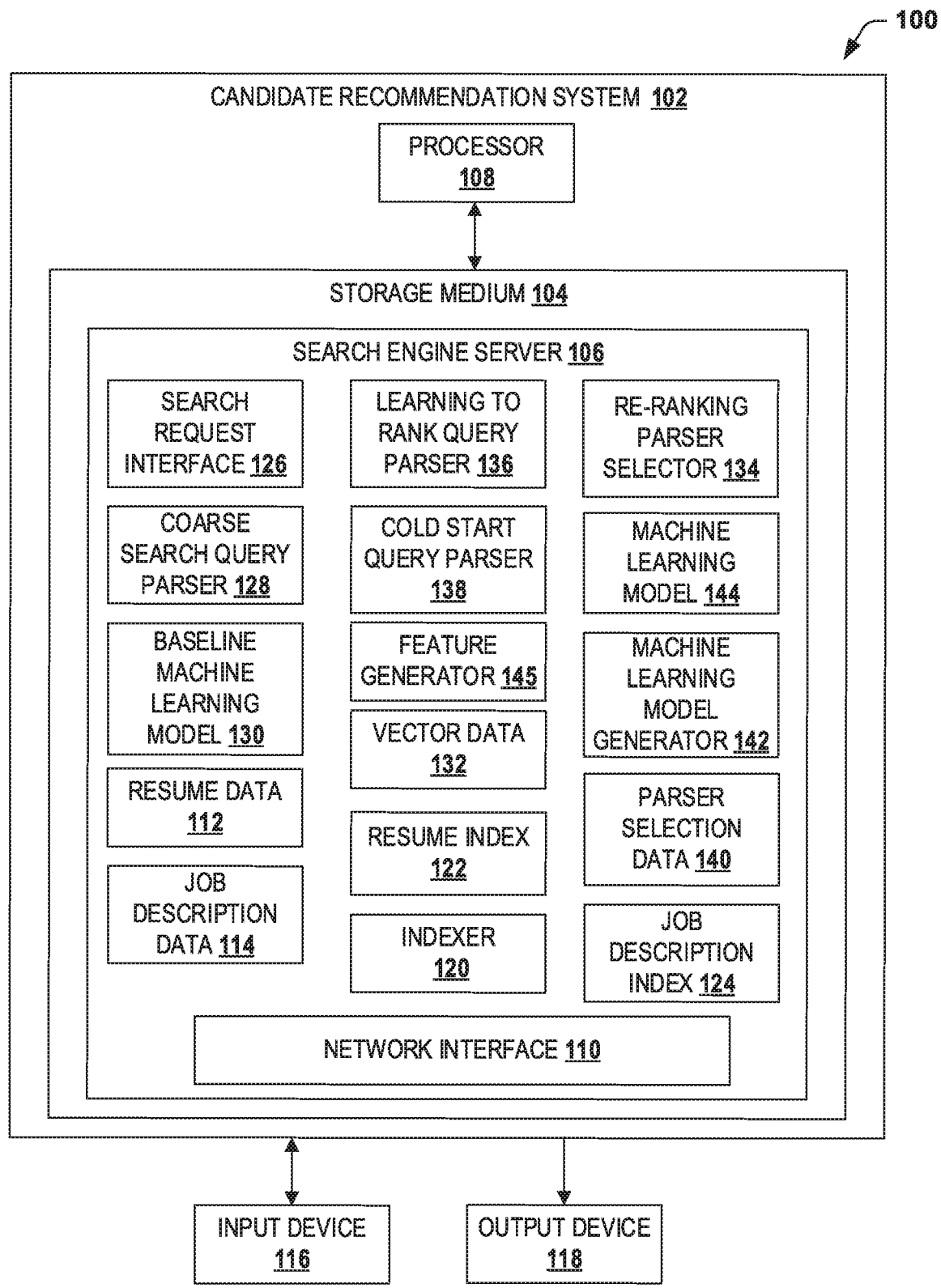
FIG. 1 illustrates an example of a candidate recommendation system.

Candidate recommendation systems are information filtering systems that have been configured to predict or identify candidates from a set of candidates that are most qualified (e.g., best fit) for a function, referred to herein as an objective. For example, candidate recommendation systems can be configured to recommend a set of most qualified applicants or other individuals for a particular job, position, or contract or similarly, a best-fit job for a specific individual from a set of available job openings, positions, or contracts. Accordingly, the term "candidate" as used herein can refer to individuals for whom a candidate document, such as a resume, project description, job application, or bio is available, a corporate entity for which a candidate document, such as a corporate website or a set of bios or resumes for relevant employees, is available, contracts, represented by a summary of the contract terms and the responsibilities of the contracting parties, or positions or jobs in which a candidate document, such as a job requisition or a less formal free-text description of the requirements and responsibilities for the job or position, is available. In some examples, the term "candidate" as used herein can include a job description for a particular job.

Candidates are matched to "objectives", which can be a job, position, project, or contract to which an individual or corporate entity is matched, or an individual or corporate entity to which an appropriate job, contract, or position is matched. In some implementations, the candidate recommendation system will be designed and trained to match a specific type of candidates (e.g., job applications) to a specific type of objective (e.g., job openings). In this example, information about the objective can be provided to the system when a candidate ranking is desired, although in other examples the information could instead be loaded and indexed prior to a candidate ranking request. In another implementation, a single system contains candidates of varying types (e.g., job candidates and job openings). In such a system, the objective is the candidate for which a query is submitted, and the objective will be matched to candidates of a different type.

Candidate recommendation systems can be configured with machine learning (ML) algorithms that can be programmed to implement candidate identification processing. These systems are often provided to organizations with an ML model (e.g., a supervised ML model), such as a ranking model, that has been trained using training data from an industry that is different from the organization's industry. Until the ML model is sufficiently trained based on industry relevant training data, a ranking quality of these systems can be suboptimal for an organization (e.g., not accurate enough) when compared to a candidate recommendation system that has been trained on industry relevant training data.

For example, when starting fresh (e.g., once deployed by the organization), training data cannot be readily available for the organization for some period of time until a sufficient level of training information (e.g., resumes) have been collected, processed and used to train the ML model. Until adequate levels of industry relevant training data has been gathered, the candidate recommendation system will be configured to provide candidate recommendations at a lower ranking quality that can be desirable, thereby providing a less accurate candidate list (e.g., for a job) to the organization. This problem that is providing best results (e.g., best ranking quality) when starting fresh or until the ML model is sufficiently trained is known as cold start. Cold start is a technical problem in computer-based information systems which involves a degree of automated data modeling. The term "cold start" derives from cars. When the engine is cold, the car is not yet working efficiently, but once the optimal temperature is reached, the car works smoothly. Thus, when the candidate recommendation system starts cold, it is not yet working efficiently (in the car example terms) until the candidate recommendation system has been sufficiently trained. The cold start problem can cause the organization to refrain from using the candidate recommendation system (e.g., for a given period of time, for example, for six months) until the system has been properly trained. In other instances, the organization can be forced to rely on using the ML model that was provided with the candidate recommendation system and has been trained on a systems provider data (e.g., manufacturer or supplier of the candidate recommendation system).

Systems and methods are described herein that overcome existing cold start problems associated with candidate recommendation systems to provide a technical solution that enables candidate recommendation systems to predict or identify the most qualified candidates (e.g., resumes, jobs, etc.) upon these systems been deployed at an organization or until an ML model has been sufficiently trained based on industry relevant training data. Examples are provided herein in context of resume-to-job recommendation, however, this disclosure should not be construed or limited to only encompass candidate matching, and can include, in other examples, different recommendation applications, such as employee matching (e.g., recommending employees for projects, functions, etc.), document matching, item matching, movie matching, song matching, consumer matching, etc.

According to the systems and methods herein, a candidate recommendation system can be configured to output candidate recommendations (e.g., a candidate list) based on a search query request submitted to the candidate recommendation system. The candidate recommendation system can be configured to implement a two-phase search scheme based on the search query request to provide the candidate list. For example, the search query request can include at least one candidate search parameter, such as a job search parameter (e.g., a job description, job title, etc. for a given job). In other examples, the at least one candidate search parameter can include a resume parameter (e.g., job experiences). In additional examples, the search query request can include a candidate re-ranking parameter for re-ranking of coarse search candidate results, such as provided during a first phase of the two-phase search scheme, as described herein.

During the first phase, a coarse search query parser of the candidate recommendation system can be programmed to generate a candidate search parameter vector to represent the at least one search parameter. A candidate vector for each candidate can be generated by applying each candidate (e.g., resume) of a plurality of candidates (e.g., resumes) to an ML model. The ML model can be representative of a ranking model that has been pre-trained based on non-industry relevant training data. Thus, the ML model can correspond to a ranking model that has been trained based on candidate information (e.g., resumes) that have been tailored for a particular industry (e.g., a tech industry) that is different from the industry (e.g., a healthcare industry) in which the candidate recommendation system is being used or is to be employed. The coarse search query parser can be programmed to compare the candidate search parameter vector to each candidate vector to identify a subset of candidates (e.g., subset of resumes), and rank the subset of candidates based on assigned scores for the subset of candidates to provide an initial ranked candidate list (e.g., an initial ranked resume list). In some examples, the ML model can utilize a distance metric to select a set of top-ranking candidates. A "distance metric," as used herein, is intended to encompass any measure of the similarity or difference between two vectors of categorical or continuous values, and is explicitly intended to include metrics that do not have the triangle inequality property, such as the cosine similarity between two vectors.

In further examples, the candidate recommendation system can include a re-ranking parser selector. The re-ranking parser selector can be programmed to select a given re-ranking parser from a set of re-ranking parsers based on parser selection data. In one example, the set of parsers can include a learning to rank (LTOR) query parser and a cold start query parser. The re-ranking parser selector can be programmed to select the cold start query parser, such as during a cold start condition, based on parser selection data providing an indication that the LTOR query parser has been disabled. The cold start query parser can be programmed to evaluate a candidate index (e.g., for the plurality of candidates, or in other examples, the subset of candidates) to identify a set of candidates from the plurality of candidates based on the at least one candidate search parameter.

The set of candidates (e.g., set of resumes) can be re-ranked by the cold start query parser according to a ranking function and based on the candidate re-ranking parameter to provide an updated ranked candidate list (e.g., an updated ranked resume list). The cold start query parser can be programmed to rank the set of candidates according to a best matching ranking function, such as Okapi BM25, while in other examples, a different best matching ranking function can be employed. The updated ranked candidate list can be communicated by the candidate recommendation system to a device (e.g., for displaying thereon).

FIG. 1 illustrates an example of a candidate recommendation system 102. The system 102 can be implemented on one or more physical devices (e.g., servers) that can reside in a cloud computing environment or on a computer, such as a laptop computer, a desktop computer, a tablet computer, a workstation, or the like. In the present example, although the components of the system 102 are illustrated as being implemented on a same system, in other examples, the different components could be distributed across different systems and communicate, for example, over a network, including a wireless network, a wired network, or a combination thereof.

The system 102 can include a storage medium 104. The storage medium 104 can be representative of a non-volatile data storage, such as a hard disk drive, a solid-state drive, flash memory, etc. In some examples, the storage medium 104 can include a single discrete article or multiple articles interconnected to allow for data transfer among them, for example, via an associated bus or a local or wide-area network connection. A search engine server 106 can be stored on or in the storage medium 104. Although the search engine server 106 is illustrated in FIG. 1 as being stored on or in the storage medium 104, in other examples, at least a portion of the search engine server 106 (or corresponding portions of the storage medium 104) can be stored on another storage medium (not shown in FIG. 1) on another system (or device). In some examples, the search engine server 106 can be implemented based on a Solr search engine, which is an open source enterprise search server based on the Lucene Java search library, with extensible markup language (XML) and HyperText Transfer Protocol (HTTP) and JavaScript Object Notation (JSON) application program interfaces (APIs), hit highlighting, faceted search, caching, replication, and web administration. The Solr search engine can run in a Java servlet container, such as Apache Tomcat. In other examples, the search engine server 106 can be implemented according to a different search engine architecture.

The search engine server 106 can be representative of program instructions that can be read and executed by a processor 108. The programs instructions when executed by the processor 108 can carry out at least a portion of the functionality described herein as being performed by the candidate recommendation system 102, including candidate recommendation during a cold start condition. The executable instructions stored on the storage medium 104 can include a network interface 110 via which the candidate recommendation system 102 can communicate with other systems (e.g., other organization systems, such as a data repository or collection systems (e.g., resume aggregation systems)) via a network connection, for example, an Internet connection or a connection to an internal network.

The candidate recommendation system 102 can employ the network interface 110 to receive or retrieve candidate data from an input device 116. In some examples, the candidate data can include resume data 112 or job description data 114. In some examples, the resume data 112 or the job description data 114 can be provided by a user, such as via a keyboard and a mouse. The resume data 112 can characterize a plurality of resumes for a given job (e.g., job position). The job description data 114 can characterize the given job (e.g., job responsibilities, requirements, etc.). Each resume can be represented as resume code and can be stored as part of the resume data 112. The resume code can include information that characterizes job summary experiences, education, travel experience, etc. Likewise, each position (or job requisition) can be represented as job code and can be stored as part of the job description data 114. The job code can include information that characterizes tasks, duties and other aspects (e.g., working conditions, physical demands, salary range, etc.) of the job.

The resume code and the job code can have an open-standard file format, such as JSON, which uses human-readable text to transmit data objects consisting of attribute-value pairs and array data types (or any other serializable value). In other examples, the resume code or the job code can have a different file format, which can be an open or closed standard depending the candidate recommendation system in which the code is to be used. In further or additional examples, the candidate recommendation system 102 can employ the network interface 110 to receive or retrieve other types of candidate data, such as employee data and project data to enable searching and generating of a list of ranked candidates, such as a ranked job list, a ranked project list or a ranked employee list.

The input device 116 can be any type of device capable of supporting a communications interface to the candidate recommendation system 102. Exemplary input devices 116 can include a server, a mobile device, a mobile computer, a tablet, etc. The input device 116 can be connected to the candidate recommendation system 102 using a provided network (e.g., via common internet protocols), such as a wired or wireless network. Example networks can include an Internet, an intranet, a WiFi network, a WiMAX network, a mobile telephone network, and combinations thereof. The input device 116 can be configured to enable a user to interact with the candidate recommendation system 102 via a local interface (e.g., a web browser, software application, etc.) to execute one or more searches for relevant candidate information (e.g., a list of candidates).

As described herein, the candidate recommendation system 102 can be configured to output search result data based on the one more searches submitted to the candidate recommendation system 102. The search result data can include a list of candidates that have been ranked in an order of relevance based on the search parameter(s) submitted to the candidate recommendation system 102. For example, if the search is a resume search for a job (e.g., a healthcare coordinator), the candidate recommendation system 102 can be configured to generate a list of candidates (e.g., resumes) for the job as the search result data. Thus, the candidate recommendation system 102 can be configured to output a relevant list of ranked candidates based on the type of search parameters submitted to the system 102.

In other examples, the list of candidates can include a list of jobs for a related job (e.g., a list of jobs that is similar in function or characteristic as the other job), a list of candidates that can be similar to another candidate (e.g., a list of candidates that have job experiences similar to other candidate), a list of projects for an employee or a list of employees for a project. The candidate recommendation system 102 can be configured to provide the search result data to an output device 118 for displaying thereon. In some examples, the output device 118 can be part of the input device 116 while in other examples the output device 118 is separate from the input device 116. The output device 118 can include one or more displays, such as a monitor, heads up display or virtual reality headset or goggles.

In further examples, the search engine server 106 can be programmed to employ an indexer 120. The indexer 120 can be programmed to read and index the candidate data to provide a candidate index. Thus, the indexer 120 can be programmed to read and index the resume data 112 and the job description data 114 to provide a resume index 122 and a job description index 124. The resume data 112 and the job description data 114 can be indexed based on indexing schema data (not shown in FIG. 1) that can be user definable (e.g., via the input device 116). In some examples, the resume index 122 and the job description index 124 can be stored local to the candidate recommendation system 102 while, in other examples, can be stored at a remote location (e.g., a remote database). In further examples, the indexer 120 can be programmed to read and index other types of candidate data, such as the employee data and the project data and generate corresponding indexes (not shown in FIG. 1) to enable searching and generating of a ranked candidate list, such as the ranked job list, the ranked project list or the ranked employee list.

In additional or further examples, the indexer 120 can be programmed to generate for each document (e.g., candidate resume, job description, etc.) a corresponding feature vector that represents the semantic content of the document. For example, the indexer 120 can be programmed to apply any of a number of natural language processing (NLP) techniques to reduce the document to a vector of numerical values. In an example, the indexer 120 can be programmed to apply a bag-of-words approach to generate feature vectors. In the bag-of-words approach, each document can be represented as a feature vector generated according to a frequency of a selected vocabulary of terms within a respective document. The vocabulary of terms can be predetermined or selected a part of indexing a series of documents, for example, as the terms occurring with the highest frequency. The bag-of-words features can be weighted using term frequency-inverse document frequency (tf-idf), such that terms that occur relatively infrequently across the document are accorded more weight per occurrence than more common terms.

In another example, a topic modeling approach is utilized, in which latent topics in text of the document can be identified to provide additional data for classification. Topic modeling is an unsupervised method for topic detection, which can be used as additional information for classifying the document. In one example, the feature extractor can utilize latent semantic indexing, which is a generative topic model that discovers topics in textual documents. In latent semantic indexing, a vocabulary of terms is either preselected or generated as part of the indexing process. A matrix is generated representing the frequency of occurrence of each term in the vocabulary of terms within each document, such that each row of the matrix represents a term and each column represents a document. The matrix is then subjected to a dimensionality reduction technique, such as singular value decomposition, to project the terms into a lower dimensional latent semantic space. Each document is then represented by the projected values in the appropriate column of the reduced matrix.

In another example, a word embedding approach, such as Word2Vec, or a document embedding approach, such as Doc2Vec can be used. In Word2Vec, a neural network with an input layer, in which each node represents a term, is trained on proximate word pairs within a document to provide a classifier that identifies words likely to appear in proximity to one another. The weights for the links between an input node representing a given word and the hidden layer can then be used to characterize the content of the document, including semantic and syntactic relatedness between the words. Document embedding is an extension of the word embedding approach. In document embedding, context from each paragraph (or appropriate text) is included as an input to the model, and link weights associated with these inputs is generated for each paragraph as part of the training process, representing the specific context of that paragraph. This can be used in combination with the training data associated with the individual words to generate a document vector for the document that captures embedding representations averaged across occurring words and word sequences. In some examples, other approaches can be utilized and as such the above approaches are not exclusive.

In some instances, the search engine server 106 can include a search request interface 126. The search request interface 126 can be programmed to receive or retrieve a search query request, such as for a candidate list (e.g., a list of resumes that have been ranked in order of relevance). The search query request can include at least one candidate search parameter (e.g., terms, statements, conditions, etc.). In some examples, the search query request can further include a candidate re-ranking parameter and a re-ranking weight parameter. In other examples, the candidate re-ranking and re-ranking weight parameters can be stored local to the candidate recommendation system 102, such as in the storage medium 104.

The search query request can be provided based on user input, such as that can be received at the input device 116. In some examples, the search query request can include (or correspond to) a uniform resource locator (URL) request. Thus, in some examples, the search query request can include an HTTP search request. The candidate recommendation system 102 can be programmed to implement a two-phase search scheme based on the search query request. Thus, the candidate recommendation system 102 can be programmed to execute a first search query and a second search query based on the at least one search parameter for candidate ranking.

The search engine server 106 can include a coarse search query parser 128. During a first phase of the two-phase search scheme, the coarse search query parser 128 can be programmed to parse the search query request and execute the first search query using the at least one candidate search parameter to identify a subset of candidates from a plurality of candidates. The coarse search query parser 128 can be programmed to assign an initial score for each candidate of the subset of candidates and rank the identified subset of candidates to provide an initial ranking order for the identified subset of candidates based on respective assigned scores, thereby providing an initial ranked candidate list (e.g., an initial ranked resume list).

During a second phase of the two-phase search scheme, as described herein, a ranking module (e.g., a learning to rank (LTOR) query parser 136 or a cold start query parser 138) can be programmed to execute the second search query based on the plurality of candidates (or in other examples based on the subset of candidates) to identify a set of candidates (e.g., a set of resumes). The ranking modules can be programmed to update a score initially assigned to each candidate of the set of candidates and re-rank the identified set of candidates to provide an updated ranking based on updated scores for the set of candidates, thereby providing an updated ranked candidate list (e.g., an updated ranked resume list).

The initial ranking order for the identified subset of candidates provided by the coarse search query parser 128 can be of a given ranking quality and the updated ranking order can be of a different ranking quality that is greater than the given ranking quality. The term "ranking quality," as used herein, can refer to a value (e.g., a number, a probability distribution, etc.) that can correspond to a measure of performance for a given ranking order. Accordingly, the candidate recommendation system 102, during the first phase, can be programmed to provide a first ranking order for the subset of identified candidates, and during second phase, can refine the coarse ranking, such that the updated ranking order for the set of candidates has a greater ranking quality.

Continuing with the first phase of the two-phase search scheme, the coarse search query parser 128 can be programmed to communicate with a baseline machine learning (ML) model 130. The baseline ML model 130 can correspond to a ranking model that has been trained to rank based on non-industry relevant training data. The term "industry relevant," as used herein, is a modifier relating to data that has more relevance for a given industry that another industry. The term "non-industry relevant," as used herein, is a modifier relating to data that has more relevance in the other industry than the given industry. For example, non-industry relevant training data can include resumes that have been tailored for a job in an industry different from which the candidate recommendation system 102 is being employed. In contrast, industry relevant training data can include resumes that have been tailored for a job in the industry in which the candidate recommendation system 102 is being utilized. Thus, in some examples, the industry relevant training data can include at least some or all of the resume data 112 stored in the storage medium 104. The industry relevant training data can be provided from or by an external system (e.g., a data repository system or a data aggregation system). In some examples, the baseline ML model 130 can be representative of a Doc2Vec model that has been pre-trained based on training data for another industry.

Continuing with the first phase, the coarse search query parser 128 can be programmed to generate a candidate search parameter vector of numerical values to represent the at least one candidate search parameter from the search query request. During this process, for example, the coarse search query parser 128 can be programmed to use one or more words from at least one candidate search parameter to generate the candidate search parameter vector of numerical values. In some examples, the coarse search query parser 128 can be programmed to remove one or more words (e.g., such as duplicate words) before generating the candidate search parameter vector of numerical values. The coarse search query parser 128 can be programmed to convert each obtained word (and thus characters) into a Unicode format. The coarse search query parser 128 can be programmed to feed the obtained words into the baseline ML model 130 to generate the candidate search parameter vector (e.g., a fixed-length numerical vector) to represent at least one candidate search parameter (e.g., the job description information and the job title information).

In further examples, during the first phase, the coarse search query parser 128 can be programmed to retrieve the candidate data (e.g., the resume data 112, the job description data 114, etc.) and for each candidate (e.g., resume, job description, etc.) generate a candidate vector to represent the candidate by feeding obtained words from each candidate (e.g., document, such as resume) into the baseline ML model 130. The candidate search parameter vector and each candidate vector can be stored in the storage medium 104 as vector data 132. In further examples, the coarse search query parser 128 can be programmed to compare each candidate search parameter vector and each candidate vector to determine whether if any document (e.g., resume) includes one or more words that match one or more words of the search query request (e.g., the job description information or the job title information). During these comparison operations, the coarse search query parser 128 can be programmed to use a distance metric to determine a degree of similarity between the candidate search parameter vector and each candidate vector. Once scores have been calculated for the candidate vectors, the scores can be ranked, and a set of candidate vectors associated with the highest scores can be selected.

In one example, the score for each candidate vector can be determined as the cosine similarity between the candidate vector and the candidate search parameter vector. The cosine similarity, $C_{AB}$, between a candidate vector, A, and a candidate search parameter vector, B, is determined as:

$$C_{AB} = \frac{A \cdot B}{\|A\| \|B\|} \qquad \text{Eq. 1}$$

where $A \cdot B$ represents a dot product between vectors A and B, $\|A\|$ represents a magnitude of vector A, and $\|B\|$ represents a magnitude of vector B.

For example, the coarse search query parser 128 can be programmed to execute a sumquery command to take into account a cosine similarity and the job title on profile experiences of resumes for the candidates. An example sumquery that can be implemented by the coarse search query parser 128 is sum(product(if (exists(query ({!v='profileExperiences:"Quality Assurance Manager"'})), tanh (query({!v='profile Experiences:"Quality Assurance Manager"'})),0),0.3), product(${aicmCosineDistance Query},0.7)). The coarse search query parser 128 can be programmed to identify the subset of candidates based on the cosine similarity and assign a score to each identified candidate subset. Based on the assigned scores, the coarse search query parser 128 can be programmed to rank the identified subset of candidates to provide the initial ranking order for the subset of candidates, thereby providing the initial ranked candidate list (e.g., the initial ranked resume list). In some examples, the ranking can be based on a weighted mean of the title and job parameters, and can be carried out via the sumquery command.

After initially ranking the identified subset of candidates (e.g., resumes), during the second phase, a re-ranking parser selector 134 of the search engine server 106 can be programmed to select a re-ranking query parser for querying and re-ranking. The re-ranking parser selector 134 can be programmed to control which parser from a set of re-ranking parsers is selected for candidate re-ranking. The set of re-ranking parsers can include a learning to rank (LTOR) query parser 136 and a cold start query parser 138. The re-ranking parser selector 134 can be programmed to select a given re-ranking parser based on parser selection data 140 for processing (e.g., executing) of the search query request. For example, the re-ranking parser selector 134 can be programmed to select the LTOR query parser 136 based on the parser selection data 140 providing an indication that the cold start query parser 138 has been disabled. In other examples, the re-ranking parser selector 134 can be programmed to select the cold start query parser 138 based on the parser selection data 140 providing an indication that the LTOR query parser 136 has been disabled.

In further examples, the re-ranking parser selector 134 can be programmed to evaluate the at least one candidate search parameter, to determine whether the cold start query parser 138 is to be selected for querying and re-ranking based on the plurality of candidates (or in other examples based on the subset of candidates). In response to determining that the LTOR query parser 136 has been disabled and the at least one candidate search parameter includes a description parameter (e.g., a job description, resume description, project description, etc.), the re-ranking parser selector 134 can be programmed to select the cold start query parser 138. If the at least one candidate search parameter does not include the description parameter (e.g., the parameter is null or empty), the re-ranking parser selector 134 can be programmed to select the LTOR query parser 136.

In some instances, the parser selection data 140 can be provided by an ML model generator 142. The ML model generator 142 can be programmed to provide (e.g., update or generate) the parser selection data 140 to provide an indication that the cold start query parser 138 is to be used for the search query request during the second phase. For example, during the cold start condition, that is, upon a fresh start of the system 102 or until the system 102 has been sufficiently trained based on industry relevant training data, an organization employing the system 102 can refrain from using the system 102 or employ the baseline ML model 130 that has been trained on non-industry relevant training data for candidate ranking. The ML model generator 142 can be programmed to track a training progression of an ML model 144. The ML model generator 142 can be programmed to update the parser selection data 140 (e.g., continuously or periodically following each training instance) to provide an indication of which re-ranking parser should be employed by the system 102 during the second phase based on the training progression of the ML model 144. The re-ranking parser selector 134 can be programmed to employ the cold start query parser 138 for the search query request until the parser selection data 140 provides an indication that the LTOR query parser 136 is to be employed (e.g., selected or used).

As described herein, during the cold start condition, the system 102 can be configured to provide a ranking order (e.g., a ranked candidate list) of a greater ranking quality than a candidate recommendation system that employs the baseline ML model 130 for generating the ranked candidate list. Thus, the system 102 can provide a cold start technical solution that enables candidate recommendation systems to predict or identify the most qualified candidates (e.g., resumes, jobs, projects, employees, etc.) upon these systems been deployed at the organization or until the candidate recommendation system (e.g., the ML model 144) has been sufficiently trained on industry relevant training data. As mentioned, the term "industry relevant," as used herein, is a modifier relating to data that is a collection of information that has more relevance for a given industry that another industry.

The ML model generator 142 can be programmed to generate the ML model 144 and train the model 144 based on industry relevant training data (e.g., industry relevant resume training data), such as the resume data 112. As additional industry relevant training data becomes available and is provided to the search engine server 106 (e.g., by an external system or by user input), the ML model generator 142 can be programmed to retrain the ML model 144 based on the additional training data to improve a ranking quality of the ML model 144. Thus, as the candidate data is improved in richness (e.g., depth) with additional resumes, the ML model generator 142 can be programmed to retrain (e.g., continuously, periodically (e.g., daily, weekly or monthly), etc.) the ML model 144 to improve a performance of the ML model 144 for providing the ranked candidate list.

In some examples, to determine a measure of performance (e.g., effectiveness) and thereby ranking quality of the ML model 144 (or the baseline ML model 130), the ML model generator 142 can be programmed to evaluate the ranking quality being provided by the ML model 144 (e.g., following each training or prior to each training). In some examples, an area under a receiver operating characteristic curve (AUC) technique can be employed by the ML model generator 142 to provide a measure of classification performance for the ML model 144. An AUC measure can provide an aggregate measure of performance across all possible classification thresholds for the ML model 144. AUC ranges in value from 0 to 1. A model whose predictions are 100% wrong has an AUC of 0.0; one whose predictions are 100% correct has an AUC of 1.0. Thus, AUC can be employed by the ML model generator 142 to provide a measure of how well predictions are ranked by the ML model 144.

In other examples, a discounted cumulative gain (DCG) measure can be implemented by the ML model generator 142. DCG can measure the effectiveness of the ML model 144 by analyzing returned results against a graded relevance scale of content items in a search engine result set. DCG measures the usefulness, or gain, of a content item based on its position in the result list. The gain is accumulated from the top of the result list to the bottom with the gain of each result discounted at lower ranks. In other examples, different measures can be implemented to determine the ranking effectiveness of the ML model 144. The ML model generator 142 can be programmed to update the parser selection data 140 to provide an indication that the ML model 144 has been sufficiently trained in response to determining the ranking effectiveness of the ML model 144 is sufficient.

For example, to determine whether the ML model 144 is trained sufficiently, the ML model generator 142 can be programmed to determine a ranking quality metric for the ML model 144, for example, using the AUC or DCG technique. In response to the determined quality metric being greater than or equal to the threshold quality metric, the ML model generator 142 can update the parser selection data 140 to communicate to the re-ranking parser selector 134 that the cold start query parser 138 should be employed for the search query request. In instances wherein the determined quality metric is less than the threshold quality metric, the ML model generator 142 can update the parser section data 140 to communicate to the re-ranking parser selector 134 that the LTOR query parser 136 should be employed, as the ML model 144 has been sufficiently trained.

In further or additional examples, the ML model generator 142 can include learning algorithms that can be programmed to extract a plurality of features based on candidate data (e.g., the resume data 112 or the job description data 114) for use at the ML model 144. In some examples, at least some of the features used for classifying documents (e.g., candidates) can be drawn from one or more fields of the candidate document (e.g., professional objective, qualifications summary, education, experience, references, etc.). To this end, a feature extractor of the ML model generator 142 can be programmed to utilize one or more NLP algorithms for extracting data from one or more fields of the candidate document. For example, the feature extractor can be programmed to determine, for each of a plurality of candidate documents, a feature vector representing the candidate document and an objective document, for example, a candidate search parameter vector as described in FIG. 1. These feature vectors can include values from the candidate and objective vectors, values derived from the candidate and objective vectors, and additional features generated from the candidate document and the objective document.

In some examples, the feature vector can include a first set of at least one feature derived from a first vectorized representation of either or both of the candidate document and the objective document and second set of at least one feature derived from a second vectorized representation of the same source or sources generated without reference to the first vectorized representation. For example, the first vectorized representation could be a document vector generated from the candidate document via a word or document embedding approach, while second vectorized representation could be a vector of normalized word frequencies generated via a bag-of-words approach, for example, from the candidate document. In some examples, the two vectorized representations can be generated from the same source document or documents, and neither vectorized representation is derived from the other. In some examples, the feature vector can include features that are derived from the document in other manners as well, such that the feature vector includes features other than the first and second sets of features. Examples of these features are discussed in detail below.

In one example, the generated features can include some or all of the values from vectorized representations generated via document embedding techniques, such as doc2vec, for the candidate document and the objective document. Where document embeddings are used for the initial ranking, these values can simply be retrieved from the stored data for the coarse search query parser 128. Otherwise, the feature generator utilizing this feature can include a document embedding model (not shown) to generate the vectors for each document.

The generated features for each candidate document can also include one or more distance metrics generated from vectorized representations of the candidate document and the objective document. These distance metrics can include, for example, the cosine similarity of Eq. 1 (or a cosine distance determined from the cosine similarity, $C_{AB}$, as $(1-C_{AB})$, a Euclidean distance, a Manhattan distance, or a Mahalanobis distance. A Euclidean distance, $E_{AB}$, between two vectors, A and B, can be calculated as:

$$E_{AB} = \sqrt{\Sigma_{i=1}^n (A_i - B_i)^2} \qquad \text{Eq. 2}$$

where $A_i$ is an $i^{th}$ element of vector A, and n is a length of vectors A and B.

A Manhattan distance, $M_{AB}$, between two vectors, A and B, can be calculated as:

$$M_{AB} = \Sigma_{i=1}^n |A_i - B_i| \qquad \text{Eq. 3}$$

where $A_i$ is an $i^{th}$ element of vector A, and n is a length of vectors A and B.

A Mahalanobis distance, $MH_{AB}$, between two vectors, A and B, can be calculated as:

$$MH_{AB} = \sqrt{(A-B)^T S^{-1} (A-B)} \qquad \text{Eq. 4}$$

where S is an n×n covariance matrix for the parameters represented by the elements of vectors A and B, a superscript T indicates the transpose of a vector, and a superscript −1 indicates an inverse of a matrix.

Other distance metrics, for example, as calculated in Eqs. 1-4, can be calculated for other vectorized representations generated for the candidate document and the objective document using models other than the natural language processing model used at the indexer 120. Accordingly, the features generated at the feature generator can include distance metrics calculated for vectors generated via multiple natural language processing models, such as latent sematic indexing, bag-of-words, and doc2vec.

Other features can be generated as an Okapi BM25 score executed on the candidate documents and the objective document. The Okapi BM25 is a bag-of-words style technique that generates a score for a document based on the normalized frequency of a set of keywords within the document. In one implementation, a first Okapi BM25 score can be calculated using the body of the candidate documents and the objective documents, and a second Okapi BM25 score can be calculated by comparing corresponding portions of the objective document and the candidate documents. In one example, a job title in the objective document is compared to job titles found within the candidate documents.

In some examples, a Jaccard similarity can be calculated from sets of words generated from the candidate documents and the objective document, or from predefined portions (e.g., job titles) of those documents. In the Jaccard similarity, instead of using derived numerical values from the documents, the set of words is extracted as categorical data, such that the objective document is represented as a set of object keywords, for example, in a predetermined or trained vocabulary, and each candidate document is represented as a set of candidate keywords. For each set of candidate keywords, C, an intersection with the set of objective keywords, O, can be determined, and the Jaccard similarity, $J_{OC}$, between the objective document and the candidate document, can be calculated as:

$$J_{OC} = \frac{|O \cap C|}{|O \cup C|} = \frac{|O \cap C|}{|A| + |B| - |O \cap C|} \qquad \text{Eq. 5}$$

where |A| is the size of a set A and A∩B is the intersection of sets A and B.

Other features can be generated from specific information within the candidate documents and the objective documents. For example, each of a required number of years of experience for a job and the years of relevant experience for a job applicant can be extracted from the candidate document and the objective document. These values, either in addition to or in alternative to a difference between the two values, can be used as features at the ML model 144. A most recent employer for a job candidate can also be used as a categorical feature. Finally, one or more features can be extracted from a job code associated with a job requisition or description. This can include the entire job code or one or more portions indicated as relevant, such as a portion indicating a seniority level of the job. Since the formats of job codes can vary among institutions, a parsing structure for the job code can be defined by a user via the input device 116.

In an example, a bag-of-words approach is utilized for feature vector generation and extraction. In another example, a topic modeling approach is utilized, in which latent topics in the candidate document text can be identified to provide additional data for classification. Once an appropriate set of latent topics are identified during training of the ML model 144, the feature extractor can transform each candidate document into a topic representation formed from the latent topics expected to generate the words observed in the candidate document. In another example, a word embedding, such as Word2Vec, or a document embedding approach, such as Doc2Vec can be used. It will be appreciated that the above approaches are not exclusive, and that multiple approaches can be utilized.

The ML model 144 can be programmed to use the extracted features to classify novel candidate documents (e.g., resumes), that is, a candidate document that was not presented in a training set for the ML model 144, into one or more of a plurality of candidate document classes having an associated rank. The ML model 144 can be programmed to utilize one or more pattern recognition algorithms, implemented, for example, as classification and regression models, each of which analyze the extracted features or a subset of the extracted features to classify the candidate documents into one of the plurality of candidate document classes (e.g., resumes classes). The selected class can be provided to a user at an associated display (e.g., at the output device 118) or stored on the storage medium 104. Where multiple classification and regression models are used, the ML model 144 can include an arbitration element that can be utilized to provide a coherent result from the various algorithms. Depending on the outputs of the various models, the arbitration element can simply select a class from a model having a highest confidence, select a plurality of classes from all models meeting a threshold confidence, or select a class via a voting process among the models. Alternatively, the arbitration element can itself be implemented as a classification model that receives the outputs of the other models as features and generates one or more output classes for the candidate documents.

The ML model 144, as well as any constituent models, can be trained on training data representing the various classes of interest. It will be appreciated that, where multiple models are used, a given model may not consider all of the plurality of the output classes associated with the ML model 144 as a whole. In some examples, the ML model 144 can be programmed to use a plurality of individual models that each generate a confidence for a single class, with the arbitration component selecting either the class associated with the model with the highest confidence or all classes associated with models producing a confidence value above a selected threshold value. The training process of a given model will vary with its implementation, but training generally involves a statistical aggregation of training data into one or more parameters associated with the output classes. Any of a variety of techniques can be utilized for the models, including support vector machines, regression models, self-organized maps, fuzzy logic systems, data fusion processes, boosting and bagging methods, rule-based systems, or artificial neural networks.

For example, a support vector machine (SVM) classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class and an associated confidence value can be determined for a given input feature vector according to its position in feature space relative to the boundaries. The SVM classifier utilizes a user-specified kernel function to organize training data within a defined feature space. In the most basic implementation, the kernel function can be a radial basis function, although the systems and methods described herein can utilize any of a number of linear or non-linear kernel functions.

An artificial neural network (ANN) classifier can include a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function. A final layer of nodes provides the confidence values for the output classes of the ANN, with each node having an associated value representing a confidence for one of the associated output classes of the classifier.

A regression model applies a set of weights to various functions of the extracted features, most commonly linear functions, to provide a continuous result. In general, regression features can be categorical, represented, for example, as zero or one, or continuous. In a logistic regression, the output of the model represents the log odds that the source of the extracted features is a member of a given class. In a binary classification task, these log odds can be used directly as a confidence value for class membership or converted via the logistic function to a probability of class membership given the extracted features.

A rule-based classifier applies a set of logical rules to the extracted features to select an output class. The rules can be applied in order, with the logical result at each step influencing the analysis at later steps. The specific rules and their sequence can be determined from any or all of training data, analogical reasoning from previous cases, or existing domain knowledge. One example of a rule-based classifier is a decision tree algorithm, in which the values of features in a feature set are compared to corresponding threshold in a hierarchical tree structure to select a class for the feature vector. A random forest classifier is a modification of the decision tree algorithm using a bootstrap aggregating, or "bagging" approach. In this approach, multiple decision trees are trained on random samples of the training set, and an average (e.g., mean, median, or mode) result across the plurality of decision trees is returned. For a classification task, the result from each tree would be categorical, and thus a modal outcome can be used.

In response to selecting the cold start query parser 138, the re-ranking parser selector 134 can be programmed to provide the search query request to the cold start query parser 138 or provide location information for the search query request. Once activated, the cold start query parser 138 can be programmed to implement the second search query based on the resume index 122 or the job description index 124 for the plurality of candidates using the at least one candidate search parameter of the search query request. The cold start query parser 138 can be programmed to parse the search query request and execute a query based on an index (e.g., the resume index 122 or the job description index 124) for the plurality of candidates (in other examples, based on the subset of candidates identified from the first search query) to identify the set of candidates that include one or more words (e.g., job experiences, job descriptions, etc.) that closely match at least one candidate search parameter (e.g., the job description information, the job title information, etc.). If the at least one candidate search parameter is null or empty, the cold start query parser 138 can be programmed to notify the re-ranking parser selector 134. The re-ranking parser selector 134 can be programmed to disable the cold start query parser 138 in response to being informed by the cold start query parser 138 that the at least one description parameter is null or empty, such that no candidate ranking will be implemented by the candidate recommendation system 102.

In some examples, the cold start query parser 138 can be programmed to sanitize the search request. The cold start query parser 138 can be programmed to remove HTML tags, extra blank spaces, and special or reserved characters from the at least one candidate search parameter that can cause an error in querying of the candidate index (e.g., the resume index 122 or the job description index 124). As explained herein, the cold start query parser 138 can be programmed to employ the candidate re-ranking parameter and the re-ranking weight parameter for re-ranking of the initial candidate list during the second phase. The candidate re-ranking parameter can specify an N number of top candidates (e.g., resumes) from the first search query that should be re-ranked, wherein N is integer greater than or equal to two. The re-ranking weighting parameter can correspond to a multiplicative factor that will be applied to each score for each candidate of the set of candidates from the re-rank query, before that score is added to the initial score assigned for that candidate during the first phase. In additional or further examples, the second search query can include additional filtering that can be applied to the set of candidates. For example, if the search query request includes a willing to travel parameter, a willing to relocate parameter, a city or degrees parameter, or a type of record parameter (e.g., an applicant, a candidate or a requisition), the cold start query parser 138 can be programmed to apply filtering at the second search query to identify the set of candidates.

The cold start query parser 138 can be programmed to assign a score to each candidate of the set of candidates. The cold start query parser 138 can be programmed to apply a ranking model (e.g., a ranking function) to rank each candidate of the set of candidates based on the assigned score and the re-ranking weighting parameter, and thereby according to their relevance to provide the updated ranking order for the set of candidates (e.g., the ranked candidate list). Thus, the cold start query parser 138 can order the set of candidates in order of relevance, such that candidates having a higher degree of relevancy (e.g., higher assigned score) are assigned a higher rank. Exemplary ranking models that the cold start query parser 138 can be programmed to employ for candidate ranking include vector space models, Boolean models, and Okapi BM25, which is a bag-of-words retrieval function that ranks a set of documents based on query terms appearing in each document, regardless of their proximity within the document.

In further examples, in response to assigning the scores for the set of candidates, the cold start query parser 138 can be programmed to multiply the assigned score by the weighting parameter to provide a weighted score. Each weighted score associated with each candidate of the set of candidates can be added to the score assigned by the coarse search query parser 128 during the first phase for that candidate to provide an overall score for each candidate of the set of candidates. The cold start query parser 138 can be programmed to re-rank the set of candidates based on the overall score assigned for each candidate of the set of candidates and the candidate re-ranking parameter to provide the updated ranked candidate list. For example, the cold start query parser 138 can be programmed to execute a re-rank query command to provide the updated ranking for the set of candidates. As an example, the reRank Query command can be: reRankQuery="profileExperiences: (RRT_A, Clinical Quality Management, Reviews and approves CSV documents, Internal and External Audits, Corrective and Preventive Action Plans CAPAs, FDA Regulations, EMA regulations, ICH Guidelines, Team Leadership RRT_A, Clinical Quality Management). The candidate recommendation system 102 can be configured to provide the updated candidate list as the search result data to the output device 118 for display thereon. Accordingly, the candidate recommendation 102 can be configured to provide candidate recommendations that have a greater ranking quality than candidate recommendation systems that employ a baseline ML model (e.g., the baseline ML model 130) for candidate recommendation during a cold start phase (e.g., upon a fresh start of the candidate recommendation system or until the system has been sufficiently trained on industry relevant training data).

Figure 2:
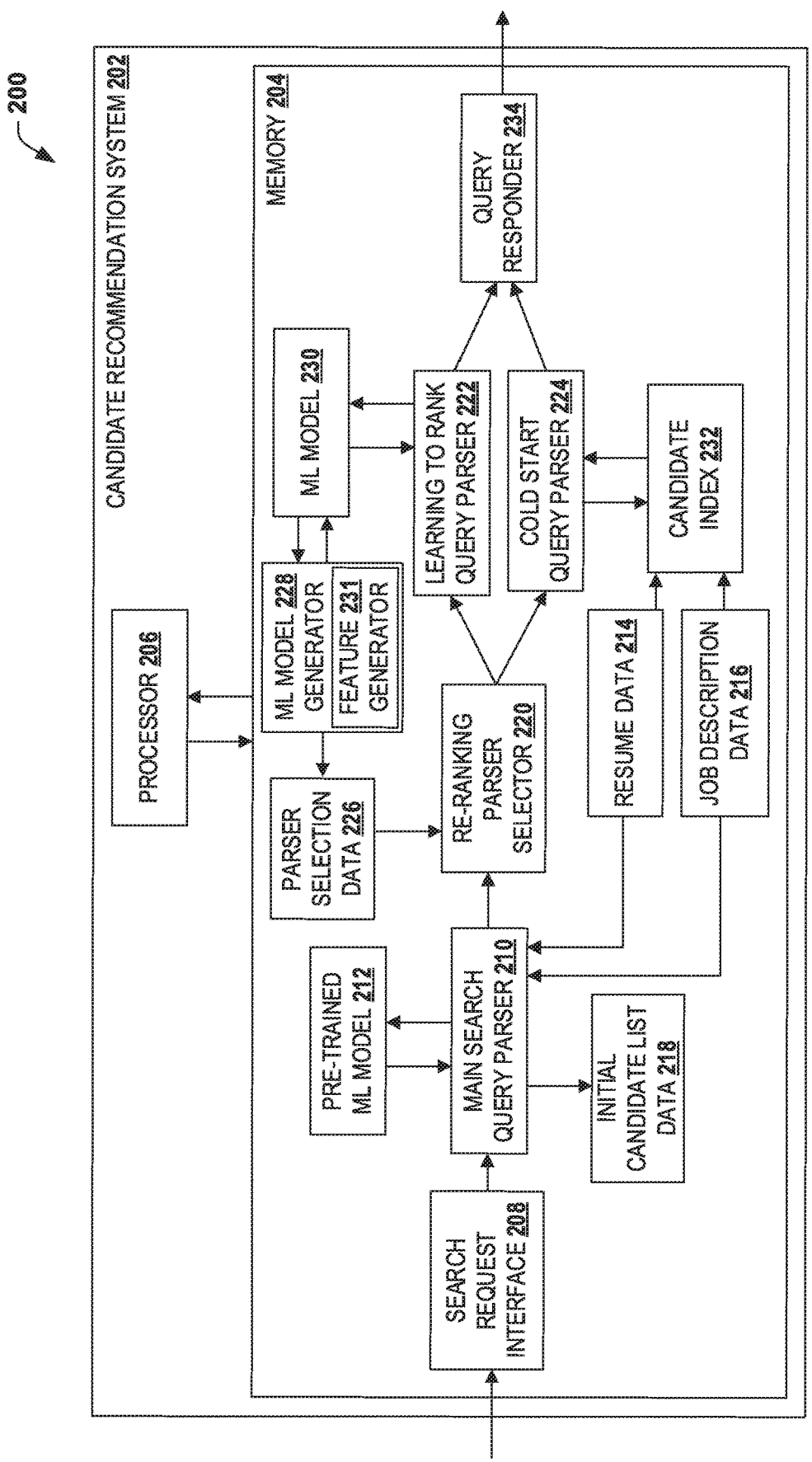
FIG. 2 illustrates an example of another candidate recommendation system.

FIG. 2 illustrates an example of another candidate recommendation system 202. The system 202 can be configured to implement candidate recommendation, such as resume and job recommendation. Thus, the system 202 can be configured to receive a job description for a job and identify relevant resumes or receive a resume and identify relevant jobs. In some examples, the system 202 can correspond to the system 102, as illustrated in FIG. 1. The system 202 can be implemented on one or more physical devices (e.g., servers) that can reside in a cloud computing environment or on a computer, such as a laptop computer, a desktop computer, a tablet computer, a workstation, or the like. The system 202 includes memory 204 and a processor 206. The memory 204 can include program instructions that can be executed by the processor 206 to implement candidate recommendation. The programs instructions when executed by the processor 206 can carry out at least a portion of the functionality described herein as being performed by the candidate recommendation system 202, including candidate recommendation during a cold start condition.

The memory 204 can include a search request interface 208. The search request interface 208 can correspond to the search request interface 126, as illustrated in FIG. 1. The search request interface 208 can be programmed to receive or retrieve a search query request, such as for a ranked candidate list (e.g., a list of resumes or jobs that have been ranked in order of relevance). The search query request can include a set of search parameters (e.g., terms, statements, conditions, etc.). For example, the search query request can include at least a job search parameter. The job search parameter can characterize a job description and a job title for a particular job. In other examples, the search query request can include a resume search parameter. The resume search parameter can characterize job experiences, training, education, etc. In further examples, the search query request can further include a candidate re-ranking parameter and re-ranking weight parameter. In other examples, the candidate re-ranking parameter and the re-ranking weight parameter can be retrieved or stored in the memory 204. In some examples, the search query request can include (or correspond to) a uniform resource locator (URL) request. Thus, in some examples, the search query request can include a HTTP search request. The search query request can be generated (or provided) by an input device (e.g., the input device 116, as illustrated in FIG. 1), such as based on user input at the input device.

The candidate recommendation system 202 can be programmed to implement a two-phase search scheme based on the search query request. Thus, the candidate recommendation system 202 can be programmed to execute a first search query and a second search query based on the set of search parameters for candidate ranking. In some examples, the candidate recommendation system 202 can be programmed to receive requisition code as the search query request. The requisition code can include the job description and job title. Thus, the requisition code can have a defined file format and can include (or be representative of) a job description and a job title. In additional or alternative examples, the candidate recommendation system 202 can be programmed to receive resume code as the search query request. The resume code can include the job experiences, education, skills, accomplishments, etc. The requisition code and the resume code can have an open-standard file format, such as JSON. In other examples, the requisition code or the resume code can have a different file format, which can be an open or closed standard depending the candidate recommendation system in which the code is to be used.

To implement the two-phase search scheme, the search request interface 208 can be programmed to provide the search query request to a main search query parser 210. In some examples, the main search query parser 210 can correspond to the coarse search query parser 128, as illustrated in FIG. 1. The main search query parser 210 can be programmed to parse the search query request and execute the first search query using the set of search parameters of the search query request to identify a subset of candidates (e.g., resumes or jobs) from a plurality of candidates. The main search query parser 210 can be programmed to assign an initial score for each candidate of the subset of candidates and rank the identified subset of candidates to provide an initial ranking order for the identified subset of candidates based on the assigned scores, thereby providing an initial ranked candidate list (e.g., an initial ranked resume list or an initial ranked job list).

By way of example, the main search query parser 210 can be programmed to communicate with a pre-trained machine learning (ML) model 212. In some examples, the pre-trained ML model 212 can correspond to the baseline ML model 130, as illustrated in FIG. 1. The pre-trained ML model 212 can correspond to a ranking model that has been trained based on non-industry relevant training data. In some examples, the pre-trained ML model 212 can be representative of a Doc2Vec model that has been pre-trained based on training data (e.g., resume training data or job training data) for another industry. In the first phase, the main search query parser 210 can be programmed to generate a candidate search vector of numerical values representing the set of search parameters (e.g., the job search parameter or resume search parameter) from the search query request. During this process, for example, the main search query parser 210 can use one or more words from the set of search parameters to generate the candidate search vector of numerical values. In some examples, the main search query parser 210 can be programmed to remove one or more words (e.g., such as duplicate words) before generating the candidate search vector of numerical values. The main search query parser 210 can be programmed to convert each obtained word (and thus characters) into a Unicode format.

In further examples, the main search query parser 210 can be programmed to feed obtained words from the set of search parameters into the pre-trained ML model 212 to generate the candidate search vector (e.g., a fixed-length numerical vector) to represent the search parameters (e.g., the job parameter or the resume parameter). The main search query parser 210 can be programmed to retrieve or receive candidate resume data 214 (e.g., the candidate resume data 112, as illustrated in FIG. 1) or job description data 216 (e.g., the job description data 114, as illustrated in FIG. 1). For each resume or job description, the main search query parser 210 can be programmed to generate a candidate vector to represent the resume or job description by feeding obtained words from each resume or job description into the pre-trained ML model 212. The candidate search parameter vector and each candidate vector can be stored in the memory 204 as vector data (e.g., the vector data 132, as illustrated in FIG. 1).

The main search query parser 210 can be programmed to compare each candidate search vector and each candidate vector to determine whether if any resumes or job descriptions include one or more words that match one or more words of the set of search parameters (e.g., the job search parameter or the resume search parameter). During these comparison operations, the main search query parser 210 can be programmed to use a cosine distance as a similarity measure in a feature space that includes the candidate search vector and the candidate vectors. The main search query parser 210 can be programmed to identify the subset of candidates based on the cosine similarity and assign a score to each identified subset of candidates. Based on the assigned scores, the main search query parser 210 can be programmed to rank the identified subset of candidates to provide the initial ranking order for the subset of candidates, thereby providing initial candidate list data 218.

The main search query parser 210 can be programmed to store in the memory 204 the initial candidate list data 218 for processing during the second phase of the two-phase search scheme. The initial candidate list data 218 can identify the subset of candidates (e.g., resumes or job descriptions), scores assigned to each candidate of the subset of candidates, and the initial ranking order for the subset of candidates. In some examples, in response to storing the initial candidate list data 218, the main search query parser 210 can be programmed to communicate with a re-ranking parser selector 220 to initiate selection of a re-ranking query parser for querying and re-ranking. In other examples, the re-ranking parser selector 220 can be initiated (e.g., activated) in response to detecting the initial candidate list data 218 (e.g., being stored in the memory 204). The re-ranking parser selector 220 can correspond to the re-ranking parser selector 134, as illustrated in FIG. 1. The re-ranking parser selector 220 can be programmed to control which parser from a set of re-ranking parsers is selected for candidate re-ranking as identified by the initial candidate list data 218 during the second phase.

In some examples, the set of re-ranking parsers can include a learning to rank (LTOR) query parser 222 and a cold start query parser 224. The re-ranking parser selector 220 can correspond to the LTOR query parser 136 and the cold start query parser 224 can correspond to the cold start query parser 138, as illustrated in FIG. 1. The re-ranking parser selector 222 can be programmed to select a given re-ranking parser based on parser selection data 226 for processing (e.g., executing) of the search query request. The parser selection data 226 can correspond to the parser selection data 140, as illustrated in FIG. 1. For example, the re-ranking parser selector 220 can be programmed to select the LTOR query parser 222 based on the parser selection data 226 providing an indication that the cold start query parser 224 has been disabled. In other examples, the re-ranking parser selector 220 can be programmed to select the cold start query parser 224 based on the parser selection data 226 providing an indication that the LTOR query parser 222 has been disabled.

In other or further examples, the re-ranking parser selector 220 can be programmed to evaluate the set of search parameters, such as the job search parameter, to determine whether the cold start query parser 224 should be selected for querying and re-ranking of the plurality of resumes (e.g., based on the subset of resumes identified by the initial candidate list data 218). In response to determining that the LTOR query parser 222 has been disabled and the job search parameter is not set to zero or missing, the re-ranking parser selector 220 can be programmed to select the cold start query parser 224. If the job search parameter is null or empty, the re-ranking parser selector 220 can be programmed to select the LTOR query parser 222.

In some examples, the parser selection data 226 can be provided by an ML model generator 228 (e.g., the ML model generator 142, as illustrated in FIG. 1). The ML model generator 228 can be programmed to update the parser selection data 226 (e.g., continuously or periodically following each training instance) to provide an indication of which re-ranking parser should be employed by the re-ranking parser selector 220 during the second phase. Upon a fresh start of the system 202 or until the system 202 has been sufficiently trained based on industry relevant training data, an organization employing the system 202 can refrain from using the system 202 or employ the pre-trained ML model 212 for candidate recommendation. The ML model generator 228 can be programmed to evaluate an ML model 230 to determine a level of training (e.g., ranking quality of the ML model 230).

The ML model generator 228 can be programmed to update the parser selection data 226 (e.g., continuously or periodically following each training instance) to provide an indication of which re-ranking parser should be employed by the system 202 based on the ranking quality of the ML model 230. The re-ranking parser selector 220 can be programmed to employ the cold start query parser 224 for the search query request until the parser selection data 226 provides an indication that the LTOR query parser 222 is to be employed (e.g., selected or used), such as during a non-cold start condition for the candidate recommendation system 202.

The ML model generator 228 can be programmed to generate the ML model 230 and train the model 230 based on industry relevant training data (e.g., industry relevant resume training data). As additional industry relevant resume training data becomes available and is provided to the system 202 (e.g., by an external system, or by user input), the ML model generator 228 can be programmed to retrain the ML model 230 based on the additional training data to improve a ranking quality of the ML model 230. Thus, the ML model generator 228 can be programmed to retrain (e.g., continuously, periodically (e.g., daily, weekly or monthly), etc.) the ML model 230 to improve a performance of the ML model 230 for providing a ranked candidate list.

In some examples, to determine a measure of performance (e.g., effectiveness) and thereby ranking quality of the ML model 230 (or the pre-trained ML model 212), the ML model generator 228 can be programmed to evaluate the ranking quality being provided by the ML model 230 (e.g., following each training or prior to each training). In some examples, an area under a receiver operating characteristic curve (AUC) technique can be employed by the ML model generator 228 to provide a measure of classification performance for the ML model 230. In other examples, a discounted cumulative gain (DCG) measure can be implemented by the ML model generator 228. The ML model generator 228 can be programmed to update the parser selection data 226 in response to determining the ranking effectiveness of the ML model 230 is sufficient. The ML model generator 228 can include a feature generator 231 that can be programmed to extract a plurality of features based on the candidate resume data 214 or the job description data 216 for use at the ML model 230. In some examples, at least some of the features used for classifying resumes and job descriptions can be drawn from one or more fields of the resumes or job descriptions. To this end, the feature generator 231 can be programmed to utilize one or more natural language processing (NLP) algorithms for extracting data from one or more fields of the resumes, such as described herein.

In some examples, in response to the cold start query parser 224 being selected, the re-ranking parser selector 220 can be programmed to provide the search query request to the cold start query parser 224 or provide location information for the search query request. Once activated, the cold start query parser 224 can be programmed to implement the second search query based on a candidate index 232 using the set of search parameters of the search query request. The candidate index 232 can be generated based on at least a portion of the resume data 214 or at least a portion of the job description data 216. Thus, in some examples, the candidate index 232 can correspond to the candidate resume index 120 or the job description index 124, as illustrated in FIG. 1

By way of example, the cold start query parser 224 can be programmed to parse the search query request and execute a query based on the candidate index 232, in some examples, using the initial candidate list data 218 to identify the set of candidates from the plurality of candidates that include one or more words that closely match the set of search parameters (e.g., the job search parameter or the resume search parameter). In some examples, the cold start query parser 224 can be programmed to sanitize the search request. The cold start query parser 224 can be programmed to remove HTML tags, extra blank spaces, and special or reserved characters in the set of search parameters that can cause an error in querying the candidate index 232 for the plurality of candidates. In additional or further examples, the second search query can include additional filtering that can be applied to the set of candidates. For example, if the search query request includes a willing to travel parameter, a willing to relocate parameter, a city or degrees parameter, or a type of record parameter (e.g., an applicant, a candidate or a requisition), the cold start query parser 224 can be programmed to apply filtering at the second search query to identify the set of candidates.

In some examples, the cold start query parser 224 can be programmed to assign a score to each candidate of the set of candidates. The cold start query parser 224 can be programmed to apply a ranking model (e.g., a ranking function) to rank each candidate of the set of candidates based on the assigned score and the re-ranking weighting parameter, and thereby according to their relevance to provide the updated ranking order for the set of candidates (e.g., the ranked candidate list). Thus, the cold start query parser 224 can order the set of candidates in order of relevance, such that candidates having a higher degree of relevancy (e.g., higher assigned score) are assigned a higher rank. Exemplary ranking models that the cold start query parser 224 can be programmed to employ for candidate ranking include vector space models, Boolean models, and Okapi BM25.

In further examples, the cold start query parser 224 can be programmed to multiply the assigned score for each candidate of the set of candidates by the weighting parameter to provide a weighted score for each candidate of the set of candidates. Each weighted score associated with each candidate of the set of candidates can be added to the score assigned by the main search query parser 210 during the first phase for that candidate to provide an overall score for each candidate of the set of candidates. The cold start query parser 224 can be programmed to re-rank the set of candidates based on the overall score assigned for each candidate of the set of candidates and the candidate re-ranking parameter to provide the updated ranked candidate list.

In other examples, in response to the LTOR query parser 222 being selected, the re-ranking parser selector 222 can be programmed to evaluate and identify the set of candidates. Once activated, the LTOR query parser 222 can be programmed to implement the second search query by applying at least some of the candidates of the plurality of candidates (e.g., in some instances the subset of candidates) to the ML model 230 to identify the set of candidates and determine a new ranking order for the set of candidates, thereby providing the updated ranked candidate list.

In some examples, the set of best-ranked resumes can include between fifty and one-hundred resumes. In these examples, the feature generator 231 can be programmed to determine, for each candidate document, a feature vector representing the candidate document and the objective document. Each feature in the feature vector can be generated or derived from the candidate resume data 214 and the corresponding data for the job description. In the illustrated example, the feature generator 231 can be programmed to provide, for each of the set of best-ranked resumes, a feature vector can include:

1.) a first document vector representing the resume and generated via doc2vec;
2.) a second document vector representing the job description and generated via doc2vec;
3.) either the cosine similarity or the cosine distance between the first document vector and the second document vector;
4.) a Euclidean distance between the first document vector and the second document vector;
5.) a Manhattan distance between the first document vector and the second document vector;
6.) an Okapi BM25 score of a description portion of a job requisition against the work experience portion of the resume for the candidate;
7.) an Okapi BM25 score of the title portion of the job requisition against all job titles in the resume for the candidate;
8.) a total number of years of work experience for the candidate;
9.) a desired number of years of work experience for the job;
10.) a difference between the desired number of years of work experience for the job and the total number of years of work experience for the candidate;
11.) a job code associated with the job requisition;
12.) a seniority level for the job, as extracted from the job code;
13.) either the cosine similarity or the cosine distance between a latent semantic index (LSI) document vector for the resume and an LSI document vector for the job requisition;
14.) a Euclidean distance between the latent semantic index (LSI) document vector for the resume and the LSI document vector for the job requisition;
15.) a Manhattan distance between the latent semantic index (LSI) document vector for the resume and the LSI document vector for the job requisition;
16.) a Jaccard similarity between a set of tokens, based on a defined vocabulary, representing the resume and a set of tokens representing the job requisition;
17.) a Jaccard similarity between a set of tokens, based on a defined vocabulary, representing job titles in the resume and a set of tokens representing the title of the job requisition; and
18.) the name of a previous employer.

The ML model 230 can be programmed to assign a score to each of the best-ranked resumes using the generated feature vector using as an XGBoost model trained on labelled training data. The resulting scores can be used to provide an updated ranked candidate list representing the best-ranked resumes. In further examples, the candidate recommendation system 202 can be configured to provide the updated ranked candidate list (e.g., a query response) to a query responder 234. The query responder 234 can be programmed to format the query response and communicate the formatted query response to the input device (e.g., the input device 116, as illustrated in FIG. 1). The query responder 234 can be programmed to support various formats like XML, JSON, CSV, etc. Thus, the query responder 234 can include a plurality of query responders for different types of requests that can be received by the search request interface 208. In additional or other examples, the input device can be configured to process the updated ranked candidate list and render the list on an output device (e.g., the output device 118, as illustrated in FIG. 1) for organizational use (e.g., determining which identified candidates to interview, hire, etc. for the job). Accordingly, the candidate recommendation system 202 can be configured to provide candidate recommendations that have a greater ranking quality than candidate recommendation systems that employ a baseline ML model for candidate recommendation during a cold start phase (e.g., upon a fresh start of the candidate recommendation system or until the system has been sufficiently trained on industry relevant training data).

FIGS. 3-4 illustrate examples of ranked candidate lists. FIG. 3 illustrates an example of a candidate list 300 that includes candidates that have been ranked by a candidate recommendation system that does not employ a cold start candidate recommendation technique, as described herein. FIG. 4 illustrates an example of a candidate list 400 that includes candidates that have been ranked by a candidate recommendation system that employs the cold start candidate recommendation technique, such as the candidate recommendation system 102, as illustrated in FIG. 1 or the candidate recommendation system 202, as illustrated in FIG. 2. As illustrated in FIG. 4, candidates with least amount of data are located toward a bottom of the ranking order whereas candidates with a greatest amount of data are located toward a top of the ranking order.

Figure 5:
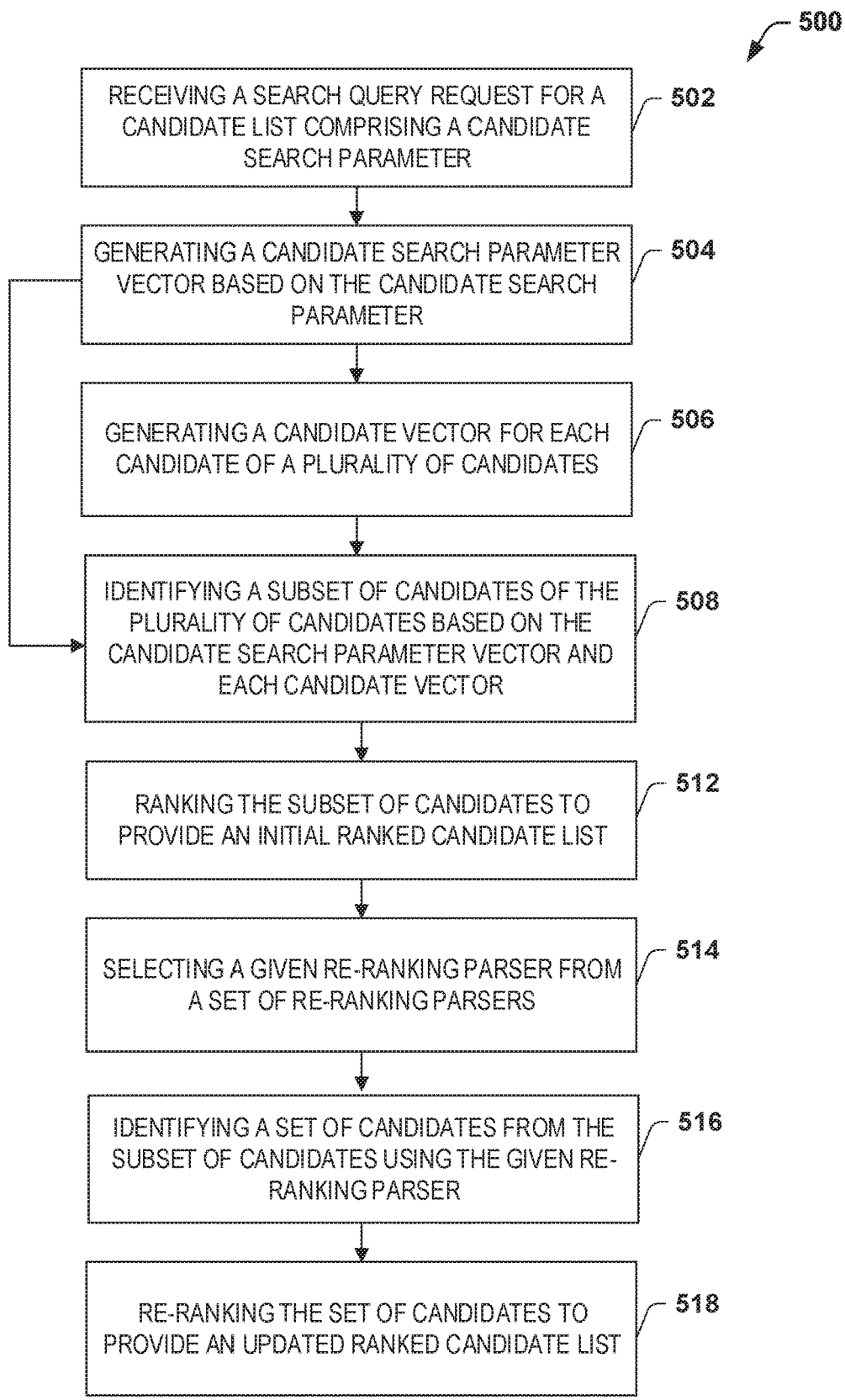
FIG. 5 illustrates an example of a computer implemented method for candidate recommendation.
Figure 6:
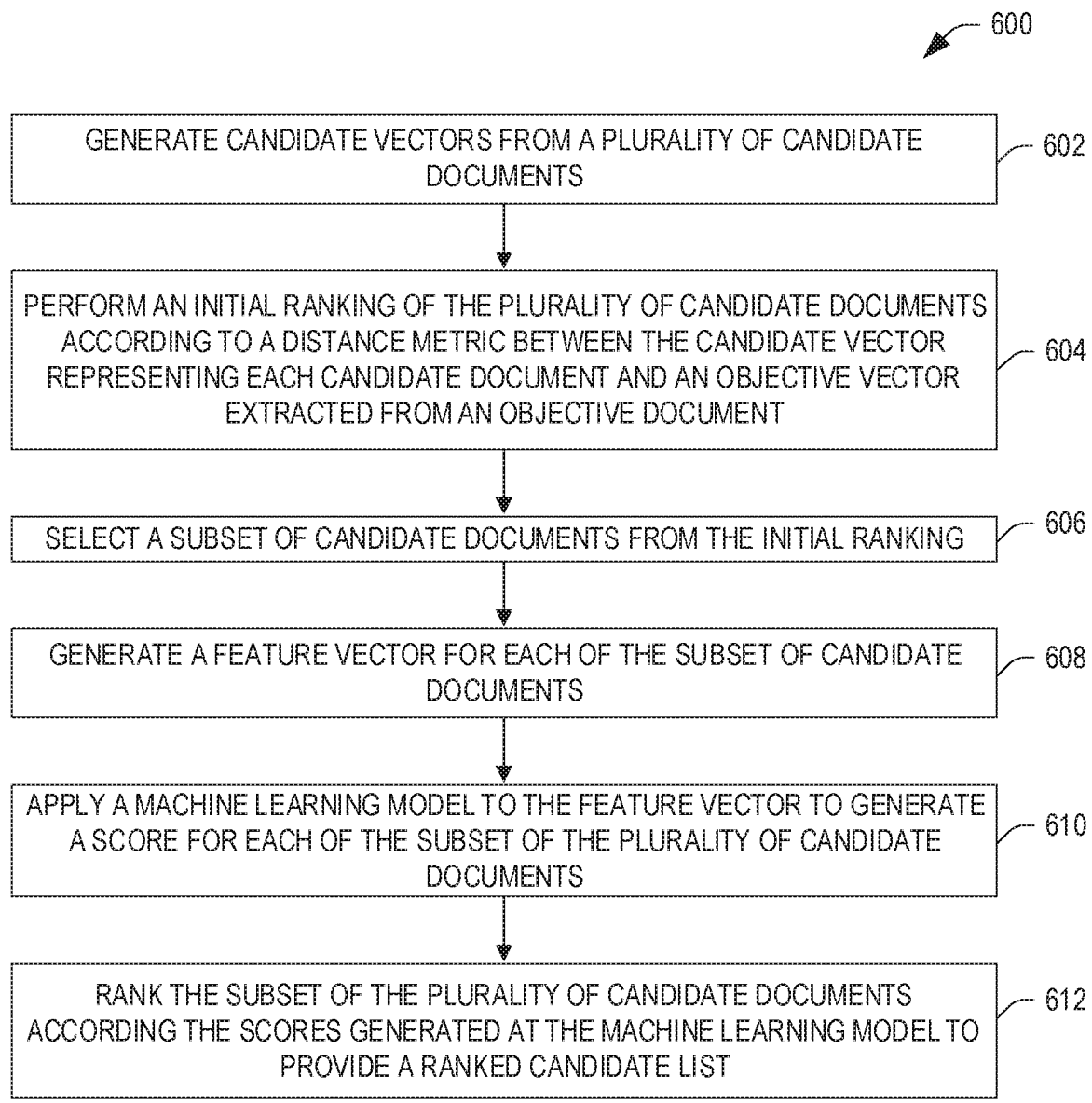
FIG. 6 illustrates another example of a computer implemented method for candidate recommendation.
Figure 7:
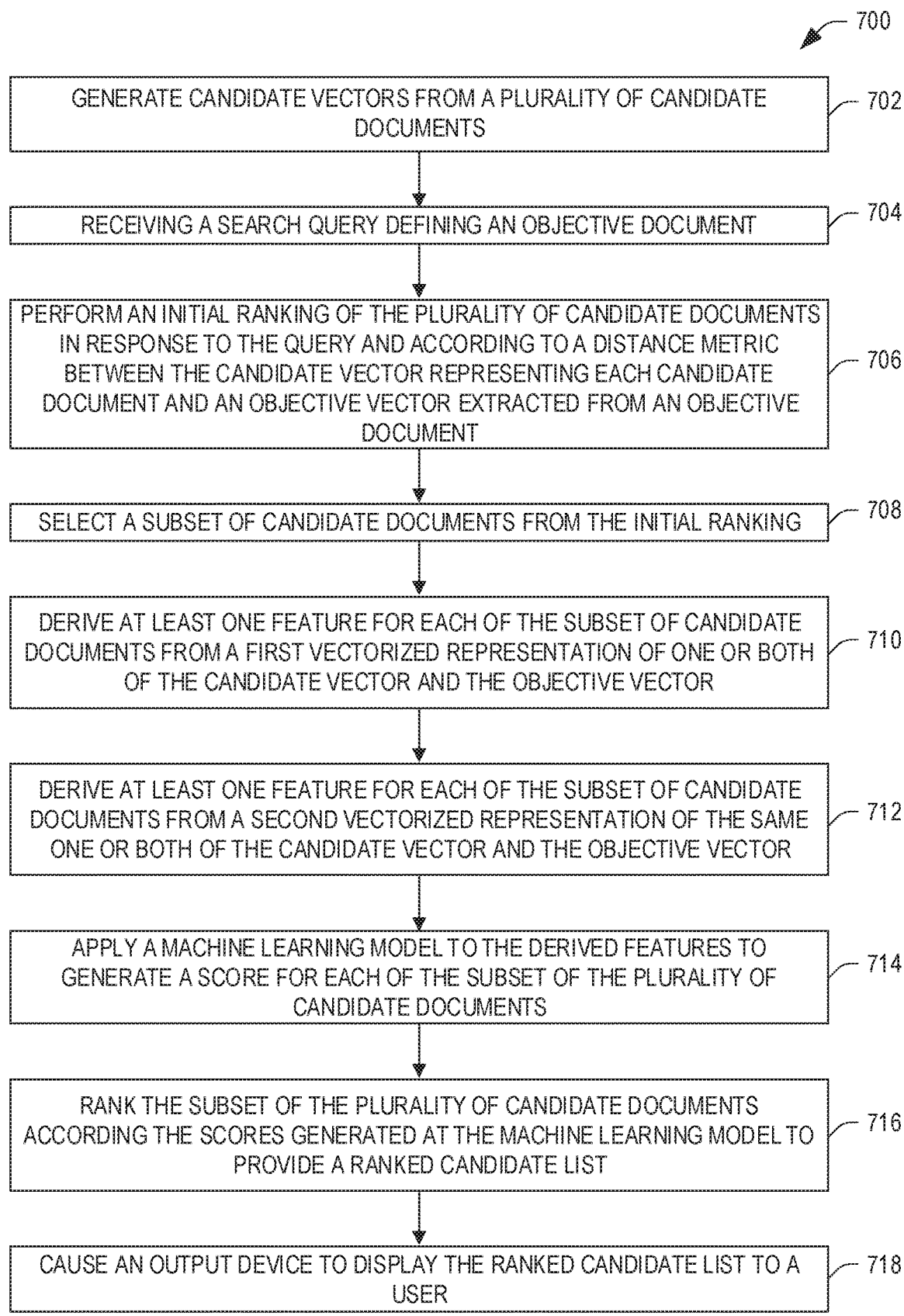
FIG. 7 illustrates a further example of a computer implemented method for candidate recommendation.

In view of the foregoing structural and functional features described above, a method in accordance with various aspects of the present disclosure will be better appreciated with reference to FIGS. 5-7. While, for purposes of simplicity of explanation, the methods of FIGS. 5-7 are shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features can be required to implement a method in accordance with an aspect the present disclosure.

FIG. 5 illustrates an example of a computer implemented method 500 for candidate recommendation. The computer implemented method begins at 502 by receiving (e.g., at the search request interface 126, as illustrated in FIG. 1) a search query request that can include at least one candidate search parameter (e.g., a job search parameter, a resume search parameter, etc.). In some examples, the search query request can include a candidate re-ranking parameter for a candidate list. At 504, a candidate search parameter vector can be generated (e.g., by the coarse search query parser 128, as illustrated in FIG. 1) to represent the at least one candidate search parameter.

At 506, each candidate of a plurality of candidates stored in memory as candidate data can be applied (e.g., by the coarse search query parser 128, as illustrated in FIG. 1) to a baseline machine learning (ML) model (e.g., the ML model 130, as illustrated in FIG. 1) to generate a candidate vector for each candidate. In some examples, the candidate data can correspond to the resume data 112 or job description data 114, as illustrated in FIG. 1. At 508, a subset of candidates of the plurality of candidates can be identified (e.g., by the coarse search query parser 128, as illustrated in FIG. 1) based on a comparison of each candidate vector and the candidate search vector. At 510, the subset of candidates can be ranked (e.g., by the coarse search query parser 128, as illustrated in FIG. 1) based on assigned scores for the subset of resumes to provide an initial ranked candidate list.

In some examples, at 512, a given re-ranking parser from a set of re-ranking parsers can be selected for processing the search query request. The set of re-ranking parsers can include a learning to rank (LTOR) query parser (e.g., the LTOR query parser 136, as illustrated in FIG. 1) and a cold start query parser (e.g., the cold start query parser 138, as illustrated in FIG. 1). At 514, a candidate index for the plurality of candidates can be evaluated (e.g., by the cold start query parser 138, as illustrated in FIG. 1) to identify a set of candidates based on candidate search parameter. At 516, the set of candidates can be re-ranked (e.g., by the cold start query parser 138, as illustrated in FIG. 1) based on updated assigned scores for the set of candidates and the candidate re-ranking parameter to provide an updated ranked candidate list.

FIG. 6 illustrates another example of a computer implemented method 600 for candidate recommendation. At 602, candidate vectors are generated from a plurality of candidate documents, each representing an associated candidate of a plurality of candidates. In some examples, the candidate vectors are generated from the plurality of candidate documents via a first natural language processing technique, such as topic modelling (e.g., latent semantic indexing, document embedding (e.g., doc2vec), or bag of words. At 604, an initial ranking of the plurality of candidate documents can be performed according to a distance metric between the candidate vector representing the candidate document and an objective vector generated from an objective document. In some examples, the objective vector can be generated from the objective document via a same natural language processing technique. The distance metric can include any of a Euclidean distance, a cosine similarity, a cosine distance, a Manhattan distance, a Jaccard similarity, and a Mahalanobis distance. At 606, a subset of the plurality of candidate documents can be selected according to the initial ranking.

At 608, a feature vector can be generated for each of the subset of the plurality of candidate documents. The feature vector includes at least a first set of features derived from a first vectorized representation of either or both of the candidate document and the objective document and a second set of features derived from a second vectorized representation of the same document or documents. In some examples, one of the vectorized representations can be either or both of the candidate vector and the objective vector, and the features generated from this vectorized representation can include values of elements of these vectors or distance metrics calculated between the two vectors. Other features can include, for example, additional distance metrics, calculated using other natural language processing techniques, features based around an applicant's years of relevant experience and the years of experience required for a job, features generated from a job code associated with the candidate or objective, and a previous employer for an applicant.

At 610, a machine learning model can be applied to the feature vector to generate a score for each of the subset of the plurality of candidate documents. The machine learning model can include, for example, one or more of a decision tree, an artificial neural network, a support vector machine, a clustering process, a Bayesian network, a reinforcement learning model, naïve Bayes classification, a genetic algorithm, a rule-based model, a self-organized map, and an ensemble method, such as a random forest classifier or a gradient boosting decision tree. At 612, the subset of the plurality of candidate documents can be ranked according the scores generated at the machine learning model to provide a ranked candidate list.

FIG. 7 illustrates a further example of a computer implemented method 700 for candidate recommendation. At 702, candidate vectors can be generated from a plurality of candidate documents, each representing an associated candidate of a plurality of candidates, via one of topic modelling and document embedding. In some examples, the candidate vectors can be generated from the plurality of candidate documents via a doc2vec process. Candidate documents can include any of job applications, job requisitions, resumes, contracts, or bio documents. At 704, a query can be received at a candidate recommend system defining an objective document. For example, the objective document can be any of a job application, a job requisition, a resume, a contract, or a bio document that would be reasonable to match to the candidate documents. In an example, the candidate document are resumes and the objective document is a job requisition.

At 706, an initial ranking of the plurality of candidate documents can be performed in response to the query and according to a distance metric between the candidate vector representing each candidate document and an objective vector generated from an objective document. In some examples, the objective vector can be generated from the objective document via the same natural language processing technique. The distance metric can include any of a Euclidean distance, a cosine similarity, a cosine distance, a Manhattan distance, a Jaccard similarity, and a Mahalanobis distance. In an example, the initial ranking can be performed using a cosine similarity. At 708, a subset of the plurality of candidate documents can be selected according to the initial ranking.

At 710, at least one feature can be derived for each of the subset of the plurality of documents from a first vectorized representation of content from the candidate document and/or the objective document. For example, the first vectorized representation can be generated via a natural language processing technique, such as word embedding, document embedding, topic modelling (e.g., latent semantic indexing, latent Dirichlet allocation, etc.), or bag of words. In some examples, the derived feature can include some or all of the elements of a vector generated from the candidate document, some or all of the elements of a vector generated from the objective document, and/or a distance metric generated from vectors generated from the candidate document and the objective document. Distance metrics can include one or more of a cosine similarity, a Euclidean distance, a Manhattan distance, and a Mahalanobis distance can be calculated as features.

At 712, at least one feature can be derived from a second vectorized representation of the candidate vector. In some examples, the two vectorized representations can be independent, such that the first vectorized representation is not derived from the second vectorized representation and the second vectorized representation is not derived from the first vectorized representation. In an example, either the first vectorized representation or the second vectorized representation can include one or both of the candidate vector and the objective vector generated during the initial ranking. In some examples, the feature vector can include features other than those at 710 and 712, including, for example, additional distance metrics, calculated using vectors other than the first and second vectorized representation and generated via other natural language processing techniques, features based around an applicant's years of relevant experience and the years of experience required for a job, features generated from a job code associated with the candidate or objective, and a previous employer for an applicant.

At 714, the generated features can be provided to a machine learning model to generate a score for each of the subset of the plurality of candidate documents. The machine learning model can include, for example, one or more of a decision tree, an artificial neural network, a support vector machine, a clustering process, a Bayesian network, a reinforcement learning model, naïve Bayes classification, a genetic algorithm, a rule-based model, a self-organized map, and an ensemble method, such as a random forest classifier or a gradient boosting decision tree. In some examples, a gradient boosting decision tree model can be employed. At 716, the subset of the plurality of candidate documents can be ranked according the scores generated at the machine learning model to provide a ranked candidate list. At 718, an output device can be caused to display the ranked candidate list.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer implemented method for candidate recommendation comprising:

receiving a search query request for a candidate list comprising at least one candidate search parameter;

executing a first search query by:
generating a search parameter vector to represent the at least one candidate search parameter;
applying each candidate of a plurality of candidates stored in memory as candidate data to a baseline machine learning (ML) model trained based on non-industry-relevant training data to provide a candidate vector for each candidate;
identifying a subset of candidates of the plurality of candidates based on a comparison of each candidate vector to the search parameter vector;
ranking the subset of candidates based on assigned scores for the subset of candidates to provide an initial ranked candidate list; and tracking a training progression of an ML model corresponding to a ranking quality of the ML model based on industry-relevant training data;

selecting a cold start query parser from a set of query parsers comprising a learning to rank (LTOR) query parser and the cold start query parser based on the training progression of the ML model;

executing a second search query using the cold start query parser by:
evaluating a candidate index to identify a set of candidates from the subset of candidates based on the at least one candidate search parameter;
re-ranking the set of candidates based on updated assigned scores for the set of candidates and a candidate re-ranking parameter to provide an updated ranked candidate list corresponding to the candidate list;

selecting the LTOR query parser from the set of query parsers based on the training progression of the ML model indicating that the ML model provides recommendations at a greater ranking quality than the baseline ML model; and executing a third search query using the LTOR query parser based on the ML model for another search query request for candidate ranking.

2. The computer implemented method of claim 1, further comprising causing an output device to display the updated ranked candidate list.

3. The computer implemented method of claim 2, wherein the re-ranking comprises applying a ranking model to provide a ranking for each candidate of the set of candidates based on the updated assigned score for each candidate of the set of candidates.

4. The computer implemented method of claim 3, wherein the ranking model comprises a bag-of-words ranking function for the ranking of each candidate of the set of candidates.

5. The computer implemented method of claim 4, wherein:
the executing of the first search query comprises assigning a first score to each candidate of the subset of candidates; and
the executing of the second search query comprises assigning a second score to each candidate of the set of candidates.

6. The computer implemented method of claim 5, wherein:
the search query request further includes a candidate re-ranking weight parameter; and
the method further comprises multiplying the second assigned score for each candidate of the set of candidates by the candidate re-ranking weight parameter to provide a weighted score for each candidate of the set of candidates.

7. The computer implemented method of claim 6, further comprising:
adding the weighted score for each candidate of the set of candidates to the first score assigned to each candidate of the set of candidates during the first search query to provide an overall score for each candidate of the set of candidates, the overall score corresponding to the updated score; and
re-ranking the set of candidates to provide a ranking order for the set of candidates corresponding to the updated ranked candidate list based on the overall score assigned for each candidate of the set of candidates and the candidate re-ranking parameter.

8. The computer implemented method of claim 7, wherein the comparing comprises using a cosine distance as a similarity measure in a feature space that includes the search parameter vector and each candidate vector to identify the subset of candidates.

9. The computer implemented method of claim 8, wherein the first score assigned to each candidate of the subset of candidates is based on the cosine distance between the search parameter vector and each candidate vector.

10. The computer implemented method of claim 9, wherein the baseline ML model is representative of a Doc2Vec model.

11. The computer implemented method of claim 10, wherein the cold start query parser is selected based on parser selection data stored in the memory indicating that the LTOR query parser is disabled, the parser selection data being generated based on the training progression of the ML model, and the cold start query parser being programmed to execute the second search query in response to the first search query.

12. A system for candidate recommendation comprising:
memory to store machine readable instructions and data, the data comprising resume data, a resume index, a baseline resume machine learning (ML) model trained based on non-industry-relevant resume training data, and a candidate re-ranking parameter; and
one or more processors to access the memory and execute the machine readable instructions, the machine readable instructions comprising:
a search request interface programmed to receive a query request for a resume list comprising at least a job search parameter that includes job information data and job title information for a job;
a coarse search query parser programmed to execute a first search query, the first search querying comprising:
generating a job search parameter vector to represent the job search parameter and a resume vector, the resume vector being generated by applying each resume of the resume data to the baseline resume ML model;
comparing the job search parameter vector and each resume vector to identify a subset of resumes from a plurality of resumes of the resume data; and
ranking the subset of resumes based on assigned scores for the subset of resumes to provide an initial ranked resume list;
a re-ranking parser selector programmed to select a cold start query parser from a set of re-ranking parsers comprising the cold start query parser and a learning to rank (LTOR) query parser;
wherein the cold start query parser is programmed to execute a second search query, the second search query comprising:
evaluating the resume index to identify a set of resumes from the subset of resumes based on the job search parameter; and
re-ranking the set of resumes according to a ranking function and based on the candidate re-ranking parameter to provide an updated ranked resumes list corresponding to the resume list; and
an ML model generator programmed to track a training progression of a resume ML model corresponding to a ranking quality of the resume ML model based on industry-relevant resume training data,
wherein the re-ranking parser selector is further programmed to select the LTOR query parser from the set of re-ranking parsers based on the training progression of the resume ML model indicating that the resume ML model provides recommendations at a greater ranking quality than the baseline resume ML model, and
wherein the LTOR query parser is programmed to execute a third search query based on the resume ML model for another query request for resume ranking.

13. The system of claim 12, wherein the baseline resume ML model is representative of a Doc2Vec model and the non-industry-relevant training data comprises a set of resumes that have been tailored for a different job than the job for which the query request has been provided to the search request interface.

14. The system of claim 13, wherein
the industry-relevant training data comprises at least a portion of the plurality of resumes for which the query request has been provided to the search request interface.

15. The system of claim 14, wherein
the tracking of the training progression of the resume ML model based on the industry-relevant training data comprises determining the ranking quality for the resume ML model; and
the re-ranking parser selector is programmed to select the cold start query parser from the set of re-ranking parsers based on the ranking quality of the resume ML model.

16. The system of claim 15, wherein the ML model generator is programmed to generate the resume ML model, and update or generate parser selection data based on the ranking quality of the resume ML model.

17. The system of claim 15, wherein the re-ranking parser selector is programmed to select the cold start query parser from the set of re-ranking parsers for processing of the query request based on the parser selection data providing an indication that LTOR query parser is disabled.

18. The system of claim 15, wherein the re-ranking parser selector is programmed to select the LTOR query parser for processing of the query request based on the parser selection data providing an indication that the cold start query parser is disabled.

* * * * *